Figure 1:
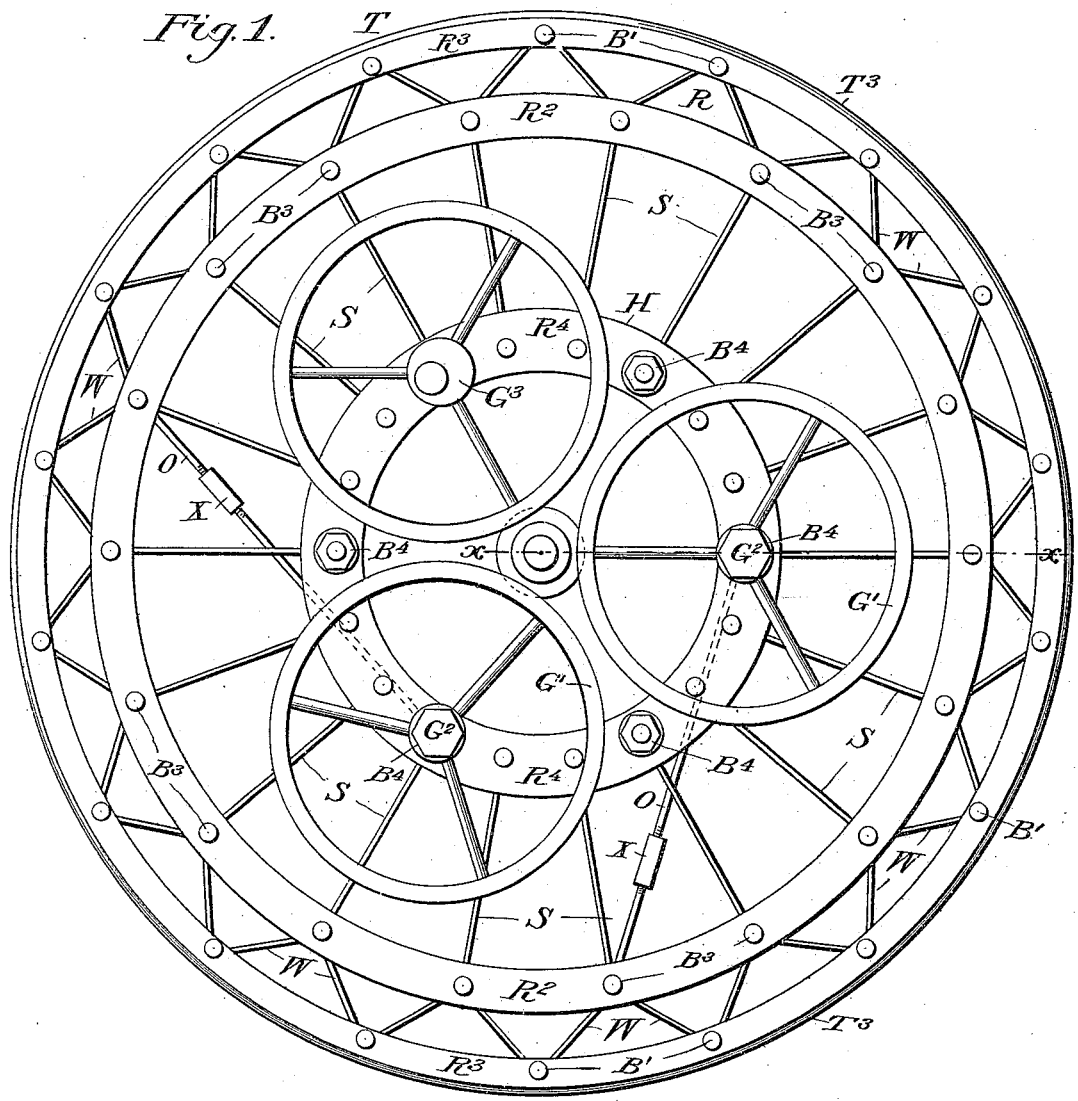

No. 641,427. Patented Jan. 16, 1900.
A. M. ALLEN.
WHEEL AND AXLE.
(Application filed July 13, 1897.)
(No Model.) 3 Sheets—Sheet 1.

Witnesses.
John T. Allen
Richard Allen

Inventor.
Arthur M. Allen

No. 641,427. Patented Jan. 16, 1900.
A. M. ALLEN.
WHEEL AND AXLE.
(Application filed July 13, 1897.)
(No Model.) 3 Sheets—Sheet 2.
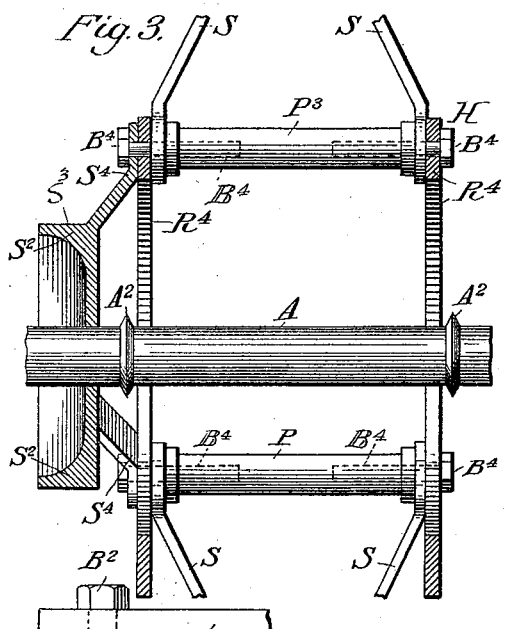
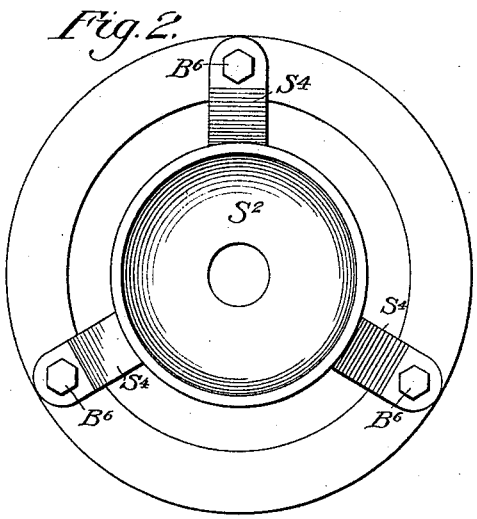
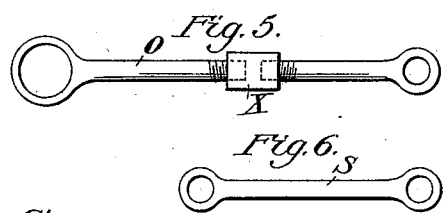
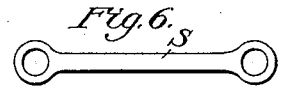
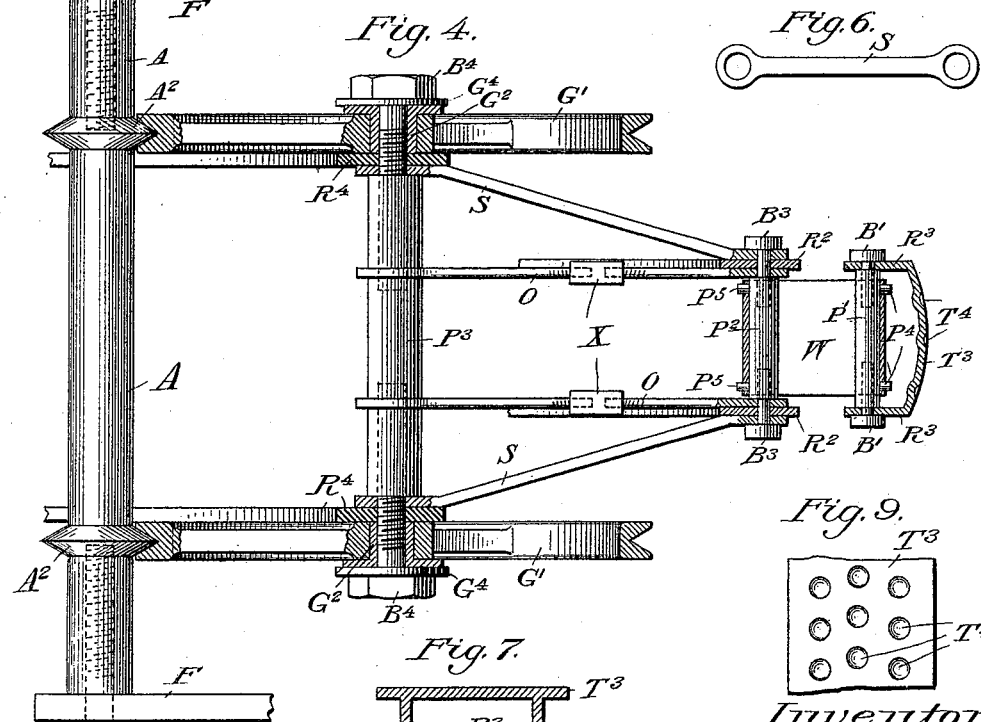
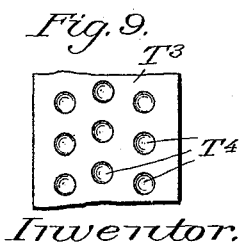
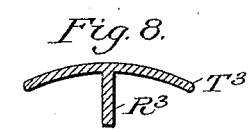
Witnesses.
John T. Allen
Richard Allen
Inventor.
Arthur M. Allen

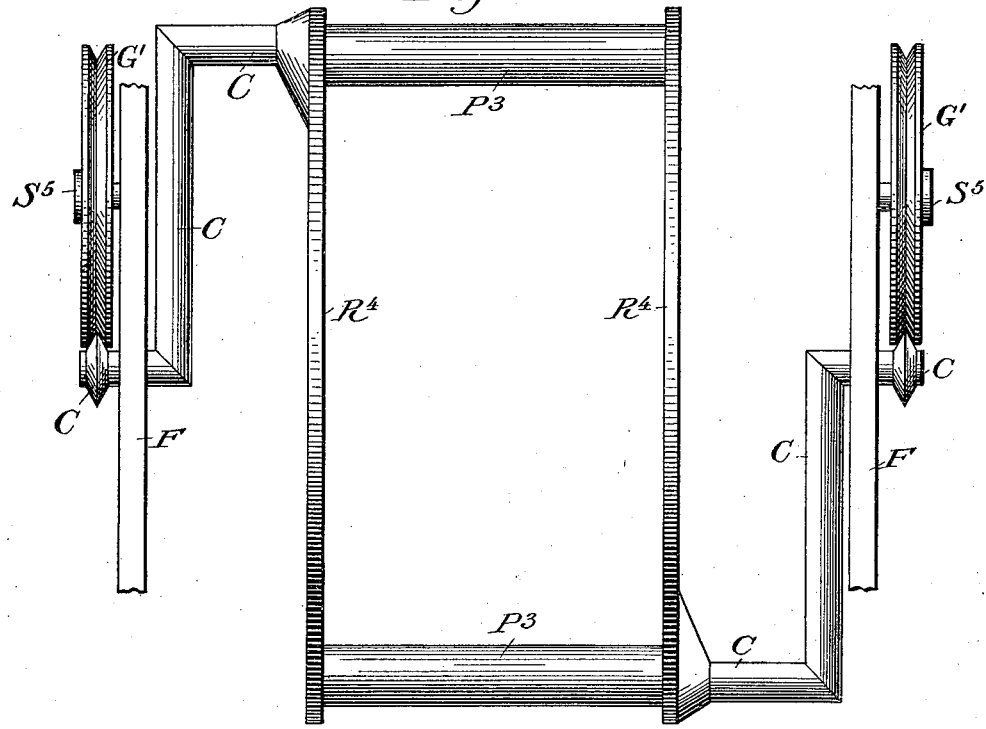
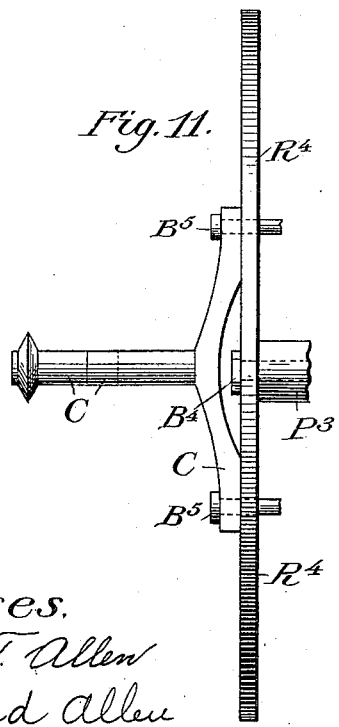
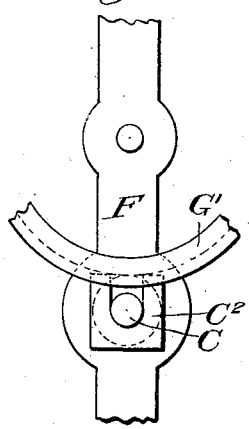

UNITED STATES PATENT OFFICE.

ARTHUR M. ALLEN, OF NEW YORK, N. Y.

WHEEL AND AXLE.

SPECIFICATION forming part of Letters Patent No. 641,427, dated January 16, 1900.

Application filed July 13, 1897. Serial No. 644,470. (No model.)

*To all whom it may concern:*

Be it known that I, ARTHUR M. ALLEN, a citizen of the United States, and a resident of New York, (West New Brighton,) Richmond county, New York, have invented a new and useful Improvement in Wheels and Axles, of which the following is a specification.

My invention relates to such improvements in vehicle wheels and axles as will make them self-centering and frictionless and provide them with great elasticity and yet a durable tread. They may be made with the axle fixed either in the frame or wheel. I attain these objects by the mechanism illustrated in the accompanying drawings, in which—

Figure 1 is a side elevation of the wheel and axle. Fig. 2 is the plan of spider-pulley $S^2$. Fig. 3 is a section of spider-pulley and wheel-hub. Fig. 4 is a section of part of the wheel on the line $x\,x$ in Fig. 1 and parts of frame F. Fig. 5 is a side view of oblique brace O. Fig. 6 is a side view of eyebar or spoke S. Figs. 7 and 8 are sections of variations in the tire. Fig. 9 is a plan of the tread, showing dimples. Fig. 10 is a section of hub H and bent axle-cranks G. Fig. 11 is a top view of one axle-crank C and hub-ring $R^4$. Fig. 12 is a side view of guide-plate $C^2$ in frame F and under axle C or the axle part of the axle-crank C.

Similar letters refer to similar parts throughout the several views.

When fixed in the frame, the axle is tubular, threaded inside of the ends, and bolted between its frame sides. Two V-shaped collars are fixed on this axle, on which six grooved wheels run, which are mounted on projections from the sides of the hub, (three on each side,) thus supporting the wheel with minimum friction. If the axle is to be fixed in the wheel, it is in two parts, each fastened on the outside of one hub-ring, and by two bends each end is set into the wheel center line and a grooved wheel arranged outside the frame on each side, which with two guide-plates in the frames under the axles and the axle-collars, also outside, will keep the wheel in position.

The hub is composed of two flat rings bolted to the opposite ends of tubes, and the three pairs of grooved wheels mounted on sleeves on the bolts outside the rings inclose and revolve on the axle. The rim is similar, with shorter tubes and lighter rings.

Spokes or eyebars, which are exact duplicates, connect the hub and rim, being arranged on the bolts between the tubes and rings. Two or more pairs of longer eyebars or braces, arranged obliquely and fitted with turnbuckles, make the spokes taut tangentially. On the outside edges of a third and larger pair of light flat rings, with their tubes and bolts, the metal tread is fastened, the rings keeping it circular under the load. This tread and rings may be rolled into one piece, like channel-iron, forming a tire guttered inward. The tread is slightly arched to serve as a narrow tread for hard roads and a wide tread for soft ones and to allow the wheel to lean over on curves. The tubes in the tire and rim have projections to enter holes in an elastic rubber suspension-strap, which passes alternately over the tire-tubes and under the rim-tubes, suspending the wheel and protecting it from shocks. For adjustment or wear of the grooved wheels one sleeve on each side of the hub is made eccentric.

The axle-collars need no lubricant, and one greasing of the grooved wheel studs or sleeves will serve for the life of the wheel.

In the drawings, axle A (see Fig. 4) is a tube and fixed in frame F by bolts $B^2$. Two V-shaped collars $A^2$ are fixed thereon to retain the wheel in position sidewise and to lessen friction. Rings $R^4$, tubes $P^3$, and bolts $B^4$ (see Fig. 4) make hub H. Rings $R^2$, tubes $P^2$, and bolts $B^3$ (see Fig. 4) make rim R. Tire T is composed of arch-tread $T^3$, side rings $R^3$, tubes $P'$, and bolts $B'$. (See Fig. 4.) On the face of the tread (see Figs. 9 and 4) are dimples $T^4$, three-fourths of an inch in diameter and three-eighths of an inch deep for grip on soft hilly roads, instead of spikes. On the sides of tubes $P'$ and $P^2$ are projections $P^4\,P^5$, (see Fig. 4,) which engage in holes in elastic flat rubber strap W (see Figs. 1 and 4) and retain it in position. With these projections and tubes leather straps or spiral metal springs may be used; but the rubber strap is preferable. After laying strap W inside of rim R hub H is hung inside of rim R by spokes S (see Figs. 1 and 6) and drawn tangentially tight by oblique braces O and their turnbuckles X (see Figs. 1, 4, and 5) till the wheel is rigid. Then alternate pairs of holes in strap W are placed over projections $P^5$ in rim-tubes $P^2$ (see Fig. 4) and the elastic loops passed outside. Tire T is then placed over all and each tire-tube P' removed in turn, an elastic loop with two holes stretched on the projections $P^4$, and the tube P' rebolted, whereby the wheel is hung in the rim. When the axle is fixed in the frame, three pairs of bolts $B^4$, which are longer than the others, support sleeves $G^2$. (See Figs. 4 and 1.) On these sleeves grooved wheels G' are mounted, (see Figs. 4 and 1,) their grooves engaging the V-shaped collars $A^2$ on axle A and supporting the road-wheel thereby sidewise in the frame. One sleeve $G^2$ on each side is eccentric (see Fig. 1) for exact adjustment and wear before locking bolts $B^4$ and washer $G^4$.

The strap W appears in my patent of May 22, 1883; but herein an improved connection to the rim and tire is shown.

The wheel is now ready to be revolved, and for connection to driving-gear a spider $S^2$, composed of a pulley or gear $S^3$, (see Figs. 2 and 3,) is secured by bolts $B^6$ through lugs $S^4$ between the three grooved wheels to the side of one hub-ring $R^4$, whereby when the wheel turns on a fixed axle it will be ready for the driving connection.

For an axle fixed in the wheel this construction is modified as follows: Two half-axles C are bolted by spread ends and bolts $B^5$ to the hub-rings $R^4$ (see Figs. 10 and 11) and their ends offset, so as to reach the wheel center line. A grooved wheel G and stud $S^5$ and collar $A^2$ are arranged outside of each frame (see Figs. 10 and 11) and the guide-plate $C^2$ set in the frame under the axle. The part of the axle C near the hub then serves as a crank-pin to be used for propulsion in place of the spider $S^2$, used when the axle is fixed in the frame.

This wheel, as shown and described, is practically frictionless, needs no lubricant, may be made as elastic as desired, has a tread as durable as any wagon, and is waterproof.

What I claim as new, and am desirous of securing by Letters Patent, is—

1. In a vehicle-wheel, two pairs of adjacent flat rings of different diameters, secured by bolt connections, and serving for the hub and rim respectively, in combination with eyebars arranged for spokes on transverse pivots in the rings.

2. In a vehicle-wheel, a hub and a rim, connected by eyebars for spokes, and provided with oblique adjustable braces, between the hub and rim for tangential tension.

3. The hub H rim P and spokes S in combination with oblique braces O and means to adjust their tension.

4. In a vehicle-wheel, an axle with collars fixed thereon, in combination with grooved wheels mounted, either in the frame, or on extensions from the sides of the hub, and cooperating with the axle-collars to support the frame, and reduce friction.

5. In a vehicle-wheel, a rigid metallic tire, composed of a metallic tread arranged over, and secured to, the edge of a flat metallic ring, to independently maintain the true circular shape, in combination with a road-wheel rim, and an elastic connection thereto.

6. In a vehicle-wheel, two flat rings with one metallic tread, fixed transversely on both outside edges, in combination with a road-wheel rim, and an elastic connection thereto.

7. In a vehicle-wheel, a metallic arch-tread with two flat rings supporting it on their edges, and an elastic connection to the rim.

8. Tire T with tubes P' in combination with elastic strap W, and the body of the wheel.

9. Tread $T^3$ side rings $R^3$, tube P' with projections $P^4$ and bolts B' in combination with elastic strap W and the rim.

10. Elastic strap W, in combination with tube projections $P^4$ on tire-tubes P' and projections $P^5$ on rim-tubes $R^2$.

11. In a vehicle-wheel, an axle with two collars fixed thereon, in combination with grooved wheels pivoted on projections from the hub ends, and arranged to run on the collars to retain the wheel in position sidewise, and to reduce friction.

12. In a vehicle-wheel, a barrel-hub with three equidistant transverse projections, on each end, and six wheels mounted thereon, which inclose, and rest on the axle between them.

13. In a vehicle-wheel, six grooved wheels G' mounted on projections, three on each side of the hub, in combination with axle A, and collars $A^2$.

14. In a vehicle-wheel, eccentric sleeve $G^3$, in combination with grooved wheel G' and bolt $B^4$ for exact adjustment of wheels G' in collars $A^2$.

15. In a vehicle-wheel, offset axles C and hub H and means to secure them together.

16. Offset axles C, hub H and bolts $B^5$ arranged in a vehicle-wheel as shown.

In testimony that I claim the foregoing as my invention I have signed my name, in presence of two witnesses, this 27th day of May, 1897.

ARTHUR M. ALLEN.

Witnesses:
ROBERT SCHELKENBACH,
JAMES WEIR.